United States Patent

[11] 3,563,352

[72] Inventor Paul H. Stibbe
Neenah, Wis.
[21] Appl. No. 841,353
[22] Filed July 14, 1969
[45] Patented Feb. 16, 1971
[73] Assignee J. I. Case Company
a corporation of Wisconsin

[54] HYDROSTATIC TRANSMISSION WITH FREEWHEEL DRIVE
6 Claims, 7 Drawing Figs.

[52] U.S. Cl. .................................................. 192/3.5,
192/45, 60/53, 74/730
[51] Int. Cl. .................................................. F16d 67/00
[50] Field of Search ....................................... 192/3.5,
4B, 3.21, 63; 74/730 (Inquired)

[56] References Cited
UNITED STATES PATENTS
2,726,513  12/1955  McWethy .................... 192/3.21X
3,074,296  1/1963  Ebert ............................. 192/3.5X Primary Examiner—Benjamin W. Wyche
Attorney—Dressler, Goldsmith, Clement & Gordon ABSTRACT: The drive system of the present application has particular utility in connection with a small vehicle, such as a garden tractor, and the propelling wheels of the vehicle are powered through a system including a belt-driven hydrostatic transmission and a gear reducer, with one-way clutch means being connected between the pulley drive system and the input shaft of the hydrostatic transmission. The one-way clutch means allows the hydrostatic transmission to transmit power to the propelling means in forward and reverse directions when the prime mover is actuated, and when the prime mover is not actuated, the one-way clutch means allows the vehicle to be moved when the control of the transmission is placed in forward or reverse directions, since the input shaft of the transmission is free to rotate in one direction relative to the belt drive system.

Patented Feb. 16, 1971
3,563,352
2 Sheets-Sheet 1
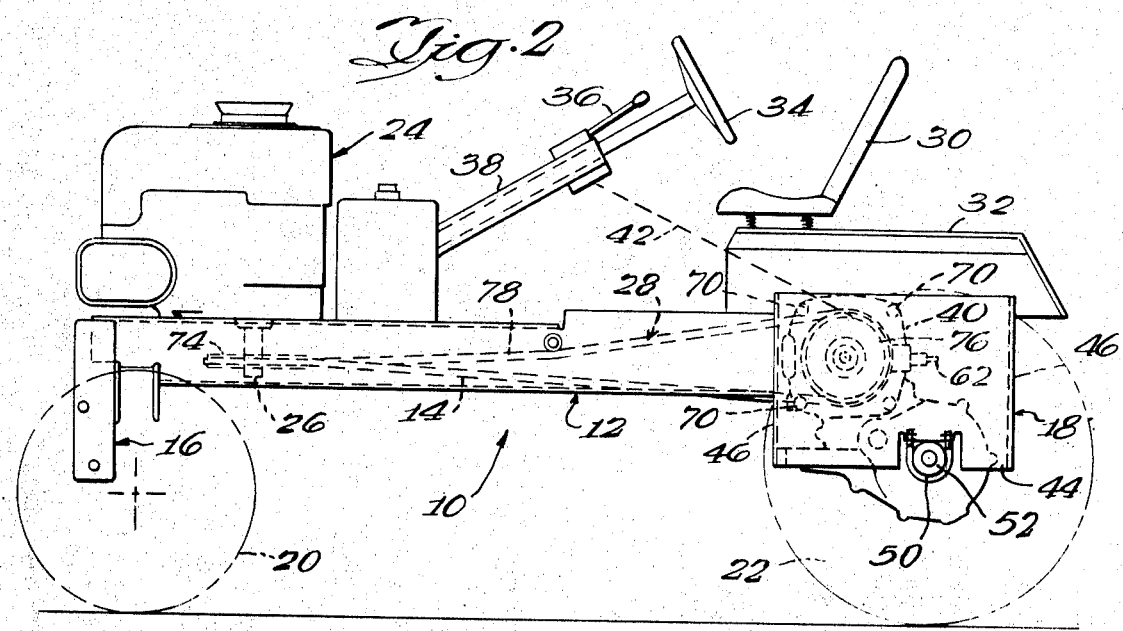
INVENTOR
Paul H. Stibbe
BY Dressler, Goldsmith, Clement & Gordon
ATTORNEYS

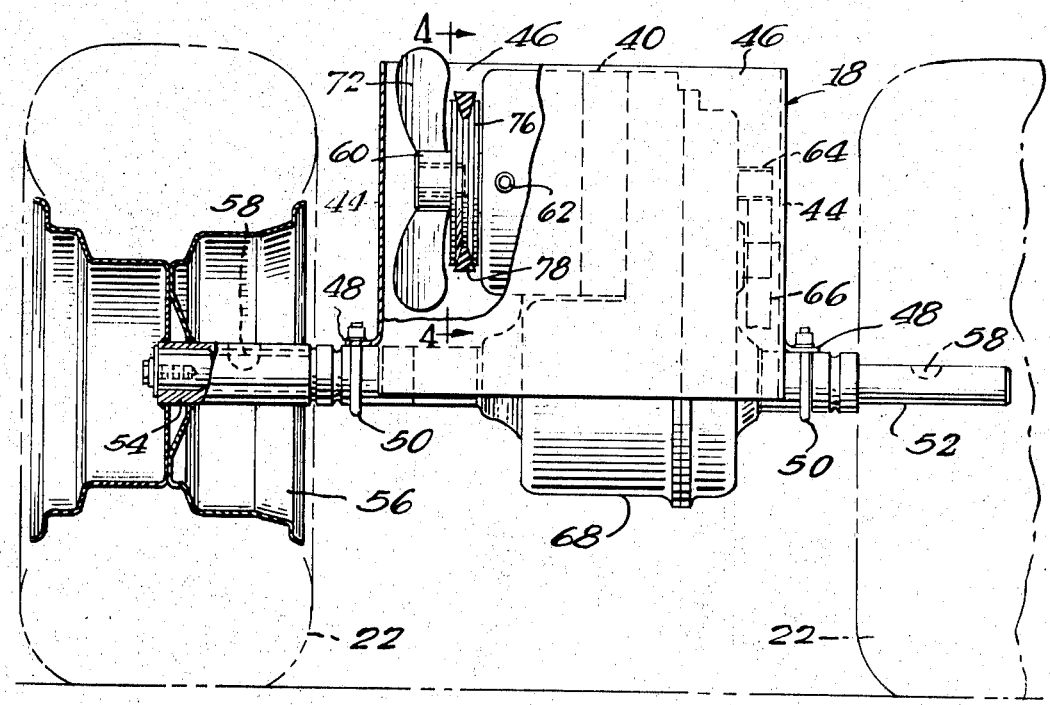
Fig. 3
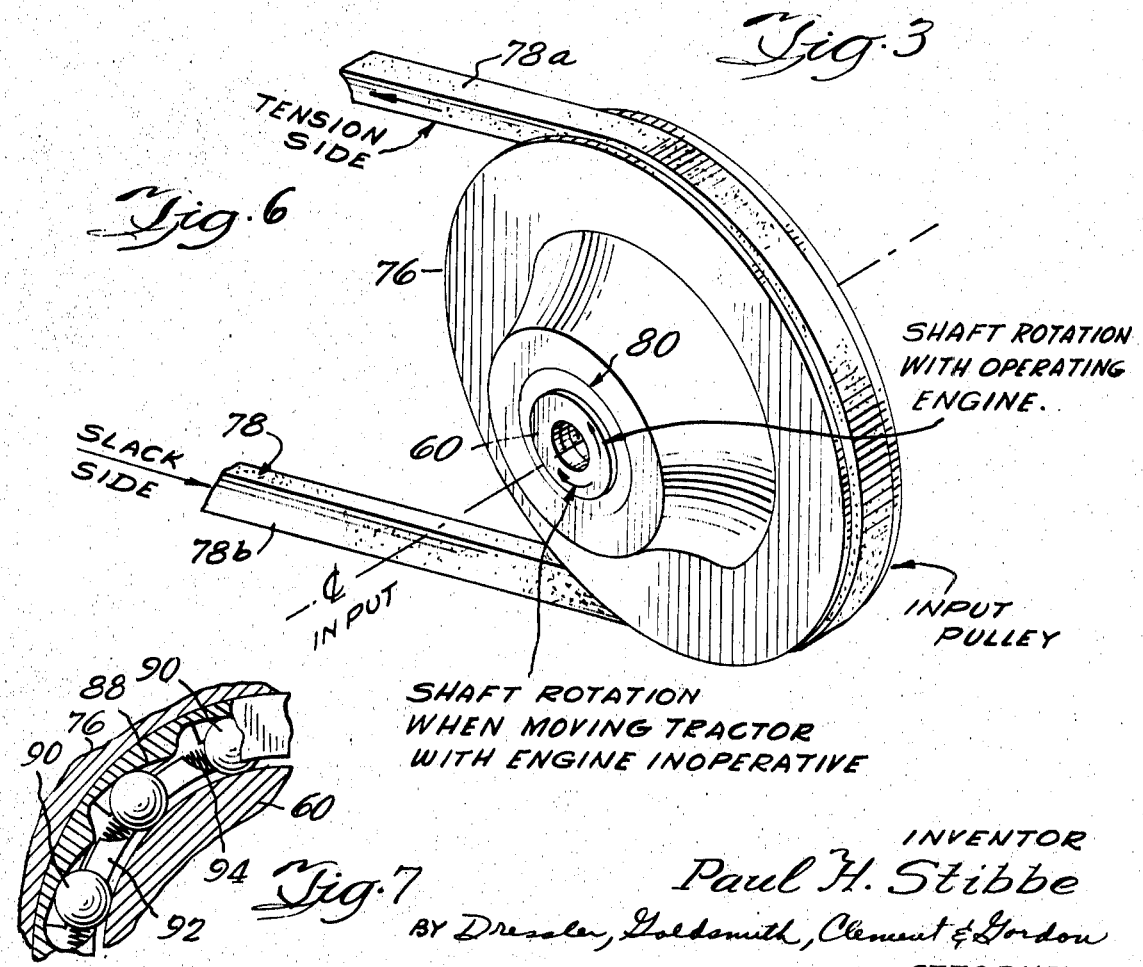
Fig. 6
Fig. 7
INVENTOR
Paul H. Stibbe
BY Dressler, Goldsmith, Clement & Gordon
ATTORNEYS

HYDROSTATIC TRANSMISSION WITH FREEWHEEL DRIVE

BACKGROUND OF THE INVENTION

In small garden variety tractors, the use of hydrostatic transmissions is becoming more and more prevalent. The output shaft of the transmission is usually directly connected to the axle of the rear or propelling wheels of the tractor, through a gear reducer unit, with a control on the transmission being selectively positionable in forward, neutral and reverse settings to allow the tractor to be propelled in forward and reverse directions. Conventional hydrostatic transmissions include a pump that is driven by a prime mover, such as an internal combustion engine, with the pump providing fluid under pressure to a motor that drives the output shaft of the transmission. The pump and motor of the transmission are connected in a closed hydraulic circuit, with the pump output flowing in one direction during forward rotation of the motor and in an opposite direction during reverse rotation of the motor. If, for example, when the prime mover is not actuated and it is desired to move the tractor, when the tractor propelling wheels rotate, the motor of the hydrostatic transmission becomes a pump and the pump of the transmission becomes a motor, and it is impossible to move the tractor without some form of disconnection means, since the input of the hydrostatic transmission is directly connected to the prime mover of the tractor.

SUMMARY OF THE INVENTION

The present invention relates to a novel means for allowing a vehicle having a hydrostatic transmission in the power train thereof to be moved when the prime mover of the vehicle is unactuated. More particularly, the present invention provides one-way clutch means on the input shaft of the hydrostatic transmission, with a driven pulley of a drive system being mounted upon the one-way clutch means for transmitting unidirectional rotary motion from a prime mover to the transmission, and with the transmission being operative to allow the vehicle propelling means to be rotated in forward and reverse directions. The output of the hydrostatic transmission is connected to the vehicle propelling wheels through a gear reducer, and the frictional losses in the mounting of the axle of the wheels, the gear reducer and the hydrostatic transmission (which losses can easily be overcome by hand force with a common garden tractor) provides a braking force which resists acceleration of the vehicle, which would occur, for example, when the vehicle is proceeding down an incline and the one-way clutch means overrides. The extreme simplicity of the drive system of the present invention makes its incorporation into low priced garden tractors economically feasible.

BRIEF DESCRIPTION OF THE DRAWINGS

FIG. 1 is a side elevational view of a vehicle, such as a garden tractor, proceeding down an incline with a cart being attached to the tractor;

FIG. 2 is an enlarged side elevational view of the tractor illustrated in FIG. 1;

FIG. 3 is a rear elevational view of the tractor structure illustrated in FIGS. 1 and 2, with certain portions being broken away and other portions being shown in section;

FIG. 4 is a fragmentary side elevational view, with portions broken away, of the input drive structure and one-way clutch means of the present invention;

FIG. 5 is an enlarged sectional view taken generally along line 5—5 of FIG. 4;

FIG. 6 is a perspective view of a portion of the drive structure to the hydrostatic transmission of the tractor illustrated in FIGS. 1—5; and FIG. 7 is an enlarged fragmentary transverse sectional view through the input shaft of the hydrostatic transmission and illustrating details of the one-way clutch means.

DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawings in detail, the drive system of the present invention is used in connection with a garden tractor type of vehicle illustrated generally at 10. Vehicle 10 includes a frame 12 in the form of a fore-and-aft extending channel member 14 and bracket means 16 and 18 are provided at the forward and rearward ends, respectively, of beam member 14 for supporting front axle means and rear axle means. The vehicle 10 is mounted for ground traversing movement by a pair of laterally spaced forward wheels 20 and a pair of laterally spaced rear wheels 22 that are mounted upon the forward and rearward axle assemblies, respectively.

As in is conventional, a prime mover 24, in the form a an internal combustion engine, is supported upon frame member 14 adjacent the forward end thereof, and the output shaft 26 (FIG. 2) of prime mover 24 extends vertically downwardly therefrom. As will hereinafter be explained in detail, drive means 28 is connected between output shaft 26 and the rear wheels 22 for powering the vehicle 10 in forward and rearward directions.

As is conventional, an operator seat 30 is provided upon support structure 32 adjacent the rearward end of frame member 14, and seat 30 is positioned to locate an operator in proper position before a steering wheel 34 that is connected to the front axle assembly, as is well known. A direction control handle 36 is mounted upon the steering column 38, and is movable between forward, neutral and reverse positions for controlling a hydrostatic transmission 40 (to be hereafter described) through a suitable linkage illustrated schematically by the broken line 42 in FIG. 2.

Referring now to FIG. 3, bracket 18 is seen to be a boxlike housing member that includes sidewalls 44 and end walls 46. Flanges 48 are bent laterally outwardly from the lower portion of sidewalls 44, and U-bolts 50 connect the transversely extending rear axle 52 to the bracket 18. Hubs 54 are connected to the rims 56 of the rear wheels 22, and the outwardly extending ends of axle 52 are connected to hubs 54 by keys 58.

The hydrostatic transmission 40 is essentially of conventional design, and a hydrostatic transmission that is suitable for the purposes of the present invention is sold by the Eaton Marshall Division of Eaton, Yale and Towne Inc., West Hanover Street, Marshall, Mich. 49068, under the trademark MARSHALLMATIC. A model 6 MARSHALLMATIC transmission has been found to be generally satisfactory in operation in connection with a seven horsepower internal combustion engine 24. As is evident from FIGS. 2 and 3, transmission 40 is housed within bracket 18 at the rearward end of the tractor to provide a substantially balanced vehicle.

The transmission 40 includes a positive displacement pump (not shown) connected in a closed hydraulic loop with a positive displacement motor (not shown). The transmission 40 also includes a transversely extending input shaft 60 that is rotated by drive means 28, and in the above-mentioned preferred transmission input shaft 60 is connected to the rotor of a variable displacement radial piston pump, the displacement of which is controlled by a control shaft 62. Control shaft 62 is connected to a retaining ring for the pistons of the pump, as is well known, and control shaft 62 is movable by handle 36 and linkage 42 to position the retaining ring in a central neutral position, an eccentric forward position, or an eccentric rearward position. The output of the fixed displacement piston motor of transmission 40 is controlled by varying the displacement of the pump of the transmission through control shaft 62 to thereby vary the speed of the vehicle in both the forward and rearward directions.

An output gear 64 is mounted upon the shaft of the motor of transmission 40, and gear 64 meshes with the input gear 66 of a gear reducer 68 that is drivingly connected with axle 52. A gear reducer unit that has been found to be suitable for the purposes of the present invention is available from the Peerless Div. of Tecumseh Products Co., Clinton, Mich., Model No. 1300. As is evident from FIG. 2, the transmission 40 is preferably secured to the gear reducer unit by bolts 70. As is evident from FIG. 3, the interior of bracket 18 is cooled by a fan 72 that is mounted upon the input shaft 60 of the transmission 40.

The drive means 28 of the present invention is illustrated in the form of a belt and pulley system, and to this end, a horizontally disposed drive pulley 74 (FIG. 2) is mounted upon the output shaft 26 of the engine 24, while a vertically disposed driven pulley 76 is mounted upon the input shaft 60 of the transmission 40. A belt 78 is trained over pulleys 74 and 76 for transmitting the unidirectional rotary motion of shaft 26 to shaft 60, and as can be best seen in FIG. 2, belt 78 makes a 90° turn between pulleys 74 and 76. As indicated by the directional arrow in FIG. 4, engine 24, shaft 26, belt 78 and pulley 74 cooperate to rotate pulley 76 and shaft 60 in a counterclockwise direction. Thus, as is indicated in FIG. 6, relatively speaking, the upper reach portion 78a of the belt 78 is under tension, whereas the lower reach portion 78b is slack. The counterclockwise rotation of pulley 76 is transmitted to shaft 60 by a one-way clutch means 80, best seen in FIGS. 4, 5 and 7.

Clutch means 80 includes an annular cup member 82 (FIG. 5) having spaced parallel flanges 84 and 86 that define a chamber therebetween. Cup member 82 is positioned concentrically upon shaft 60, and the inwardly facing surface of cup member 82 is provided with integral ramps 88 that define a narrowed passage between the outer periphery of shaft 60 and the inner periphery of cup 82. A plurality of clutch rollers 90 are spaced circumferentially around shaft 60 within cup 82, and rollers 90 are confined within a retainer ring 92 having resilient means 94 for urging the rollers 90 toward the ramps 88. Thus, as the pulley 76 rotates in a counterclockwise direction, the clutch rollers 90 are wedged between the ramps 88 and the shaft 60 to positively transmit the rotary motion of pulley 76 to shaft 60. When the engine 24 is not actuated so that the pulley 76 is stationary, the clutch means 80 allows the shaft 60 to rotate in a clockwise direction relative to pulley 76, since the clutch roller 90 merely moves against the resilient means 94, thus allowing the shaft 60 to rotate freely relative to the pulley 76.

Clutch means 80 further includes bearing means for supporting the shaft 60, and to this end, roller bearing structures are mounted outwardly of the clutch roller retaining ring 82. The bearing means include a plurality of circumferentially spaced roller bearings 96 having their axes disposed in parallelism with the axis of shaft 60, and the roller bearings 96 are retained in suitable cage structures 98.

As is evident from the above, the rotary input to the transmission 40 is unidirectional, counterclockwise in the illustrated embodiment. As is also evident from the above, the output of transmission 40 (and hence the rotation of axle 52) is multidirectional and depends upon the positioning of the control handle 36. Many times it is desired to move the tractor 10 for a short distance without starting the engine 24, and the one-way clutch means 80 provides an extremely simple structure for allowing this to occur. More particularly, in order to move the tractor 10 in either a forward or reverse direction, the handle 60 is placed in the appropriate position, and as the tractor 10 moves, the motor of transmission 40 becomes a pump and the pump a motor, and the clutch means 80 allows the shaft 60 to freely rotate in a clockwise direction relative to pulley 76.

The hydrostatic transmission 40 and gear reducer unit 68 provide a slight resistance to movement of the tractor 10, but this resistance can easily be overcome by manual force. However, the slight resistance to movement provides an advantageous effect, for example, when the tractor 10 is moving down in an incline with a heavy dump cart load, as is illustrated in FIG. 1. During such movement, without the clutch means 80, the tractor would tend to pick up some speed, but hydraulic braking would tend to maintain the speed set by the operator. During such movement in a tractor having the clutch means 80, it is possible for the clutch to release or override, and allow the tractor to move down the incline without hydraulic braking other than the hydrostatic transmission. However, because of the above-mentioned internal resistance in the transmission 40 and the gear reducer 68, acceleration of the tractor 10 is retarded and the speed of the tractor will peak out.

I claim:

1. A drive system for a vehicle comprising: a prime mover; a hydrostatic transmission having an input means and an output means; vehicle propelling means connected to said output means; and means coupling said prime mover to said input means including one-way clutch means for allowing said prime mover to drive said vehicle propelling means in forward and reverse directions when said prime mover is actuated, said one-way clutch means allowing said vehicle propelling means to move in forward and reverse directions independently of said prime mover when said prime mover is not actuated.

2. A drive system as set forth in claim 1 wherein the input means of said hydrostatic transmission is a shaft adapted to be rotated in a first direction by said prime mover and said one-way clutch means to drive said vehicle propelling means in forward and reverse directions.

3. A drive system as set forth in claim 2 wherein said coupling means further includes drive means connected to said prime mover, and driver means connected between said drive means and said one-way clutch means for transmitting unidirectional rotary motion from said drive means to the input shaft of said hydrostatic transmission.

4. A drive system as set forth in claim 3 in which said prime mover includes an output shaft, and wherein said drive means includes a first pulley on said output shaft and a belt trained over said first pulley, said driver means including a second pulley mounted on the input shaft of said hydrostatic transmission and having said belt trained therearound.

5. A drive system as set forth in claim 4 wherein said first pulley is horizontally disposed and said second pulley is vertically disposed, said belt being twisted 90° therebetween.

6. A drive system as set forth in claim 4 including bearing means associated with said one-way clutch means for rotatably mounting said input shaft.